United States Patent Office 2,766,586
Patented Oct. 16, 1956

2,766,586

CONTROL VALVES FOR HYDRAULIC PRESSES

John Maurice Towler, Rodley, and Frank Hathorn Towler, Dob Park, near Otley, England, assignors to Electraulic Presses Limited, Rodley, near Leeds, England, a British company Application May 20, 1952, Serial No. 288,796

Claims priority, application Great Britain May 24, 1951

13 Claims. (Cl. 60—52)

This invention relates to control valves for hydraulic presses and particularly for direct-hydraulic presses of the type in which the pressure liquid for the operating stroke and return stroke of the hydraulic press is directly supplied by hydraulic pumps without the interposition of a hydraulic accumulator. Nevertheless it will be understood that a hydraulic accumulator may be used for auxiliary operations or to operate the control valves.

In particular this invention relates to control valves for direct hydraulic forging and swaging presses in which it is desired to make a series of rapidly repeated short planishing strokes in addition to normal forging strokes. The invention also relates to control valves for direct hydraulic presses for such operations as forging, coining, or forming, in which it is desired to secure almost instantaneous reversal of the press ram upon completion of the pressing operation, or at a point controlled by the operator.

One object of this invention is to provide means whereby, by way of example, a direct hydraulic down-stroking press of the type described above may be manually controlled by a single operating lever with additional automatic controls to give the following sequence of operation, starting with the press ram at the bottom of its stroke, when the operator moves the operating lever to:

a. The Return position, the press ram will move rapidly upwards or away from the work.

b. The Neutral position, the press ram will be arrested at any part of the stroke.

c. The Forge position, the press ram will be pumped down or towards the work at full forging speed, the press cylinder being directly supplied with pressure liquid by the hydraulic pumps.

d. The Auto position, the press ram falls by gravity and, having contacted the work, the force applied by the press ram will be directly proportional to the force applied to the operating lever and the press ram will make a series of short forging or planishing strokes of predetermined length. Thus, if the operator applies increasing force to the operating lever towards the extreme Auto position, the press ram will apply increased force upon the work at each stroke. Immediately the operator releases the force applied to the lever, the press ram will cease to reciprocate; or the lever may be moved to the Return position and Neutral thereby arresting the press ram away from the work.

Another object of this invention, particularly as applied to a large hydraulic press, is to provide means whereby the stored energy of the compressed liquid in the press cylinder may be released very rapidly and at a controlled rate such that there is no serious shock to the hydraulic system due to surge.

A further object of this invention is to provide means whereby pressure may be built up in the pushback or return cylinders at the same time as the stored energy is being released, so that the press ram may be immediately reversed when the stored energy in the press cylinder has been released.

Yet a further object of this invention is to provide automatic means whereby the stored energy may be released and the press ram reversed when the pressure in the press cylinder reaches a predetermined figure.

Still another object of this invention, particularly as applied to a large hydraulic press, is to provide means whereby additional pumps may be connected directly to the press cylinder without passing through the directional control valve, with the result that only a comparatively small control valve is required to control the movement of the press ram even when considerable additional pump capacity is employed to provide increased pressing speed.

The present invention consists broadly in a piston type control valve for controlling the operation of an hydraulic press, which is so constructed that the valve piston is capable of being actuated by pressure fluid, preferably oil, under the control of a manually operated valve, the arrangement being such that the valve piston moves automatically, at each actuation of the manually operated valve, to a position corresponding to each such selected position of the manually operated valve.

The invention also consists of a control valve as above which is so constructed that with the manually operated valve held in one selected position, and with the pressure fluid for actuating the control valve piston under further and automatic control, the said valve piston is capable of reciprocating automatically whereby the ram of an associated hydraulic press is caused to perform a series of short forging or planishing strokes of corresponding frequency.

It is preferred that such a control valve shall be so adapted that the force applied by the press ram during each series of short forging or planishing strokes is directly proportional to the force employed by the operator in holding the manually operated valve in the selected position.

The invention also consists of control means for a hydraulic press by means of which the press ram is enabled to perform a series of short forging or planishing strokes, said control means comprising a main control valve of the piston type in which the piston is actuated by pressure fluid acting against areas on either end thereof to control the passage of hydraulic liquid to the cylinder of the press, a manually operated valve adapted to control the distribution of pressure fluid for the actuation of the valve piston of the main control valve for normal operation of the press, said manually operated valve having a valve member in the form of a sleeve which is moved by a hand lever and is mounted on and is movable relatively to one end of the piston of the main control valve, said sleeve and said piston end having ports and passages which are adapted to co-act upon predetermined relative movement between the sleeve and the piston to effect distribution of the pressure fluid such as will cause the piston of the main control valve automatically to re-position itself in relation to the sleeve following displacement of the sleeve at each selected movement of the hand lever, an automatic pressure fluid operated reversing valve which in one position of the operating lever of the manually operated valve controls the admission of pressure fluid to and its exhaust from the casing of the main control valve in such manner that with the hand lever held in the selected position the valve piston of the main control valve will reciprocate relative to the aforesaid sleeve for the purpose of producing corresponding movement of the press ram in the performance of the short forging or planishing strokes and a further valve operated by the hand lever in moving to the position of automatic control to control the operation of the reversing valve.

In order that the invention may be clearly understood and carried into effect an installation embodying control means as above will now be described by aid of the accompanying drawings in which.

Figure 1:
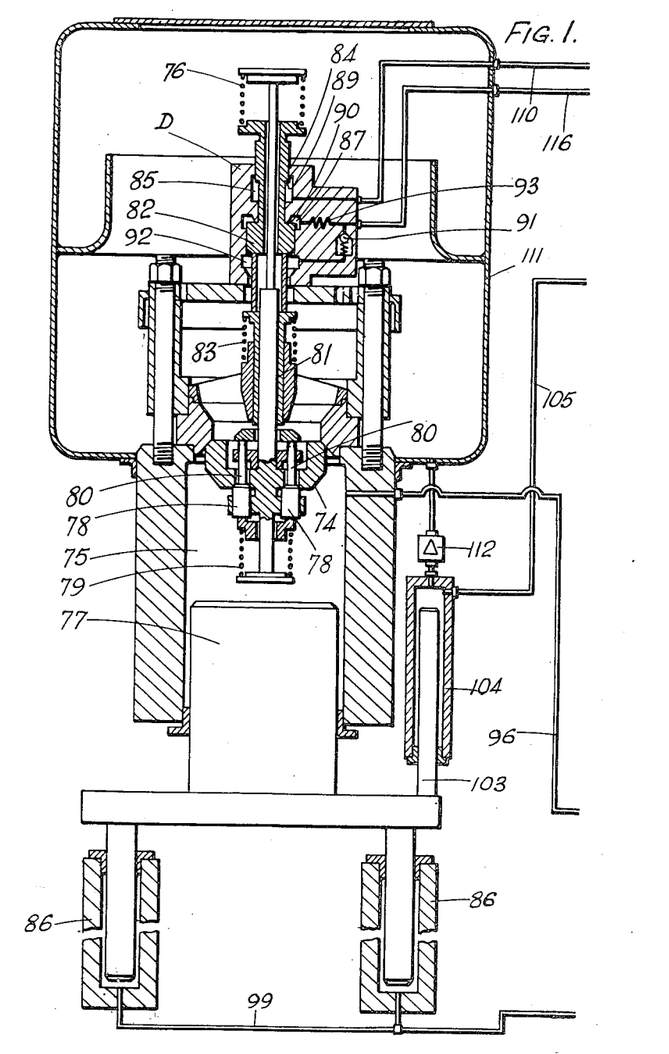
Figs. 1, 1a, and 1b together illustrate a layout of the installation embodying the principal control and other valves, two sets of continuously running pumps and a suitable hydraulic press all connected by piping.

The installation illustrated in Fig. 1 of the drawings embodies a control means according to the present invention in association with a direct hydraulic down stroking press of the type in which the pressure liquid for the operating stroke and return stroke is directly supplied by hydraulic pumps without the interposition of a hydraulic accumulator and in which the cylinder of the press exhausts through a prefill valve, said control means permitting the press ram to perform a series of short forging or planishing strokes under automatic control in addition to normal forging under manual control.

The control means illustrated for the above purpose comprises a main control valve A of the packingless piston type, an automatically operating reversing valve B, serving to control actuation of the valve piston of the main control valve during automatic operation, a further valve C operated through manual actuation of the main control valve to control the operation of the reversing valve and a prefill-exhaust valve D operating under the control of the main control valve to release the pressure within the press cylinder at a controlled rate to prevent dangerous surge.

*Main control valve*

The main control valve A comprises a valve piston or spindle 1 having ends 2 and 3 of reduced diameter, the end 2 working slidably within a bearing bush 4 which by being closed at its outer end also forms an operation cylinder or space 4a for pressure liquid to act against said reduced end 2, and the opposite reduced end 3 working slidably within bore 5a in a bearing sleeve 5 which also forms, in conjunction with the reduced end 3, a valve for controlling the reciprocating motion of the valve piston 1.

The valve piston 1 is mounted for reciprocating motion in a longitudinal bore in the body of the valve A and this bore is formed interiorly with six annular grooves or recesses which, starting from the left hand end of the figure in the drawings are numbered 6, 7, 8, 9, 10 and 11 respectively.

For the purpose of co-operating predeterminedly with five of these annular grooves the valve piston 1 is formed with three reduced sections 12, 13 and 14, separating three full diameter portions 15, 16 and 17.

The sleeve 5 is intended to be moved by hand relatively to the valve piston 1 for which purpose it is coupled to a hand lever 18 through a vertical lever arm 19 and a connecting link 20 and is mounted to slide within a bore 21 formed as an enlargement of the bore in the valve body which receives the valve piston 1, into which bore 21 the annular groove 11 opens.

The valve piston 1 is drilled or bored down its centre to provide a longitudinal passage 22 which at one end opens into the space 4a and at its opposite end opens into the interior bore 5a of the sleeve 5 through radial ports 23. The bore 5a is formed exteriorly with an annular groove 24 and this groove is cut to such a depth that at one point in its circumference it breaks into a passage 25 formed by drilling longitudinally through the thickness of the sleeve 5 so as to run parallel to the central bore 5a of the sleeve to provide a means of communication between the bore 21 at one end of the sleeve 5 and a space 26 at the outer and opposite end of the sleeve. A connection between the annular groove 11 and the interior or bore 5a of the sleeve 5 is provided by means of a radial hole 27 through the thickness of the sleeve and a longitudinal groove 28 in the exterior of the sleeve, the length of said groove being sufficient to keep the groove 11 and the radial hole 27 connected at all positions of the sleeve. A fluid tight fit exists between the sleeve, the bore 21, and between the reduced end 3 of the valve piston and bore 5a.

From the above description it will be seen that there is no direct mechanical connection between the operating lever 18 and the valve piston 1. This permits the valve piston 1 to move relatively to the lever 18.

The lever arm 19 and the link 20 are enclosed in an hermetically sealed casing 29 which is in permanent communication with chamber 21a defined by the left hand end of the bore 21 and when they are in the fully retracted or "Auto" position shown in Fig. 1, the lever holds the valve member of the valve C in the position necessary to bring about the automatic operation of the reversing valve B as will appear presently.

The valve C has a movable valve member 30 in the form of a small piston valve with its outer extremity pointed to form a needle valve 31. The casing of the valve C is constructed to provide a cylindrical bore which is divided into two chambers 32 and 33 by means of a bush 34, with the chamber 32 in open communication with the interior of the lever casing 29, and the chamber 33 closed by an end cover 35.

The bush 34 is bored to form a bearing and a support for the piston valve 30 and is reduced exteriorly to form an annular groove 36 and an annular space 37 which is spaced longitudinally from the groove 36 and opens into the outer chamber 33.

The groove 36 and the space 37 are enabled to communicate with the central bore in the bush by means of radial holes 38 and 39 respectively which communicate at their inner ends by way of an axial passage 39a through which the plunger 30 extends. A transfer passage between these radial passages is provided in the "Auto" position of the valve plunger 30 by means of a portion 40 of reduced diameter affording clearance with the walls of the passage. This reduced portion is formed in an appropriate position on the valve plunger 30 so that with the valve plunger in its normally retracted position the two sets of radial holes are isolated from each other. The valve plunger is held in the normally retracted position by means of a spring 41.

The interior of the chamber 33 is connected to the reversing valve B by means of a small outlet 42 in the end cover 35 and pipe 43, and this outlet 42 is closed by the pointed needle valve end 31 of the valve plunger when said valve plunger is fully displaced outwardly by the lever arm 19 and the hand lever 18 is held by the operator in the "Auto" position. A pipe 44 provides a permanently open connection between the annular groove 36 of valve C and annular groove 10 of the main valve A. Similarly the interior of the chamber 33 is connected by pipe 45 to a relief valve 46 and this valve in turn connects with pipe 43 by a branch 47 and with a branch 48 of a drain conduit.

*Reversing valve*

The reversing valve B is of the packingless piston type in that it has a valve piston 49 which is a sliding fit in a bore of such accuracy that the fit alone gives fluid tightness without having recourse to packings. The valve bore is formed interiorly with three annular grooves 50, 51 and 52 and the valve piston with a reduced portion 53 so positioned in relation to the annular grooves as to permit the valve piston, in one extremity of movement to pass pressure liquid from the groove 50 to the annular groove 11 at the sleeve end of the control valve A by way of the groove 51 and a pipe connection 54 to the groove 11. The valve piston 49 in the other extremity of movement is operative to connect said annular groove 11 to exhaust by way of grooves 51 and 52 and pipe connections 54 and 55.

The valve piston 49 is held frictionally in each extreme position of movement by means of spring detents which comprise balls 56 which are pressed by backing springs 57 in turn against oppositely inclined conic surfaces 58 and 59 forming a part of or an extension of the valve piston 49.

In the "Exhaust" position of the valve piston 49 the end of the extension comprising the conic surfaces 58 and 59 abuts against the inside face of a cover plate 60, which thus acts as a limit stop and in the "Pressure" position of the valve piston 49 a piston 61, hereafter termed an "actuating piston" operatively engaged with and shifted by the valve piston, abuts against the head of an adjustable stop 62. The actuating piston 61 operates within a cylinder 63 coaxial with the bore accommodating the valve piston, and upon admission of pressure liquid to this cylinder the actuating piston 62 is forced inwardly against a spring 64 and thereby forces the valve piston 49 into the "Exhaust" position against the restraining action of the detent. In this position of the actuating piston the interior of the cylinder 63 is open to exhaust and even if pressure liquid continues to enter the cylinder it will flow out to exhaust through a passage 65 running down the centre of the piston, through radial holes 66, and a recess 67 and so to a space 68 which is permanently open to exhaust through pipe 69.

The return movement of the valve piston 49 is effected by the action of pressure liquid which enters a chamber 70 containing the conic extension of the valve piston from a small space 71 within the cover 60. This space 71 receives pressure liquid from chamber 33 to valve C through pipe 43 at each opening of the hole 42 in a manner hereafter to be described and said space is permanently connected to exhaust through a choked passage 72 and pipe 73, the area of said choked passage being so predetermined as to create a back pressure within the space 71 at each sudden release of pressure through the hole 42 of valve C sufficient to overcome the spring detent and thrust the valve piston 49 of the reversing valve to the "Pressure" position, but which will act to carry away a steady flow of pressure liquid when the back pressure is dissipated.

*Combined prefill-exhaust valve*

The combined pre-fill exhaust valve D comprises a prefill valve of conventional type, being a large inverted-mushroom type valve 74 opening downwardly into the press cylinder 75 and held closed by a light spring 76; the valve 74 is opened by the pressure difference as the press ram 77 falls by gravity. The exhaust-valve is mounted in the prefill valve head and comprises an even number of small inverted seated type valves 78 parallel with and surrounding the axis of the prefill valve. These valves open inwardly into the press cylinder and they are held closed by a spring or springs 79, and will hereafter be termed "decompression valves." The said decompression valves have upwardly extending stems 80 of different lengths arranged in pairs, that is to say that diametrically disposed stems are of equal length. Thus, supposing there are six valves, they are arranged in three pairs diametrically disposed about the prefill valve axis and they are contacted by a downwardly acting striker-rod 81, which therefore unseats the decompression valves successively in pairs. The striker-rod is moved downwards by an exhaust-valve piston 82 in opposition to a spring 83 which returns the piston and rod to the upward position, out of contact with the decompression valves. The exhaust-valve piston 82 is housed in a body 84 which is divided into upper and lower chambers, the upper chamber 85 being continuously connected to the pushback cylinders 86 of the press by way of conduit 116, valve chamber 8 and conduits 107 and 99 and the lower chamber 87 is connected to the groove 7 in the main control valve A by the conduit 110. Thus when the main control-valve spindle 12 is in the Return position pressure liquid from a pair of pumps 88, hereafter termed "control pumps" is directed to the said lower chamber 87 by way of the conduit 116 and, when the control-valve spindle 12 is in the Forge position, the lower chamber 87 is free to exhaust since the conduit 116 is connected through valve chambers 7 and 6 to the exhaust pipe 109. The exhaust-valve piston has two effective areas, a small upwardly acting area 89 associated with the upper chamber 85 and a larger downwardly acting area 90 associated with the lower chamber 87. Thus, the general arrangement of the exhaust valve is such that, when pressure liquid from the control pumps 88 is directed to the lower chamber 87 the exhaust valve piston 82 moves downwards and the striker rod 81 first contacts the decompression valves, opening them successively in pairs, and finally the striker-rod pushes the prefill valve 74 off its seat and holds it open so that the press cylinder is freely open to exhaust through the prefill valve. The connection to the lower chamber is provided with a relief valve 91 which discharges into a chamber 92 at the base of the body of the exhaust valve piston 82. The said chamber 92 is normally open to exhaust, but it is closed by a bevelled lower end of the exhaust piston when it has fully opened the prefill valve. This relief valve is set at a pressure equal to or greater than that required by the rams in the pushback cylinders 86 to lift the press ram and moving parts on the return stroke. There is also a one-way choke 93 in the connection to the lower chamber 87, after the said relief valve 91; consequently the speed at which the exhaust-valve piston moves downwards to operate the decompression valves can be regulated by suitable adjustment of both the choke and the relief valve. When the control-valve is in the Return position, pressure liquid from the control-pumps 88 is directed simultaneously to the said lower chamber 87 and to the pushback cylinders 86 and consequently pressure is being built up in the pushback cylinders as the exhaust valve piston moves downwards and, immediately it closes the exhaust passage from the relief valve, the full delivery of the control-pumps 88 is directed to the pushback cylinders to effect the return stroke.

In the following description of the operation of the layout illustrated in Figs. 1, 1a, and 1b of the drawings the press cylinder is supplied with pressure liquid by a number of pumps 94, hereinafter referred to as "direct pumps" said pumps delivering through a non-return valve 95 and a pipe 96.

For a proper understanding of the operation of the complete installation illustrated it will first be necessary to describe the operation of the main control valve A. The piston or spindle 1 of this valve is always subject to a pressure tending to force the same towards the "Auto" position or to the extreme right in Fig. 1a (lower). This pressure is produced by providing by means of the pipe 97 a permanent connection between the space 4a at the left hand end of the illustrated form of the valve and a gas loaded accumulator 98. This accumulator is maintained under substantially constant pressure by connecting the same to the pushback cylinders 86 of the press through a pipe 99 and a reducer valve 100 whereby the accumulator is charged each time pressure is available in the pushback cylinders. Alternatively this servo pressure may be supplied by a small continuously running low pressure pump.

Figure 1A:
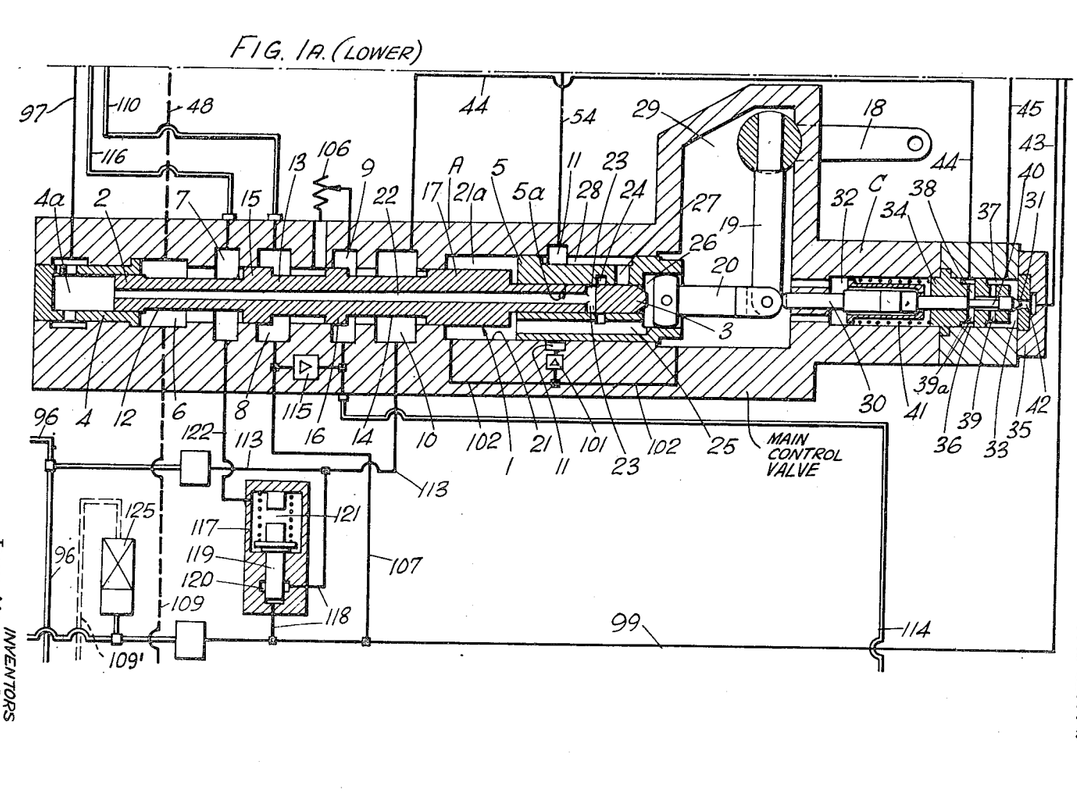
Figure 5:
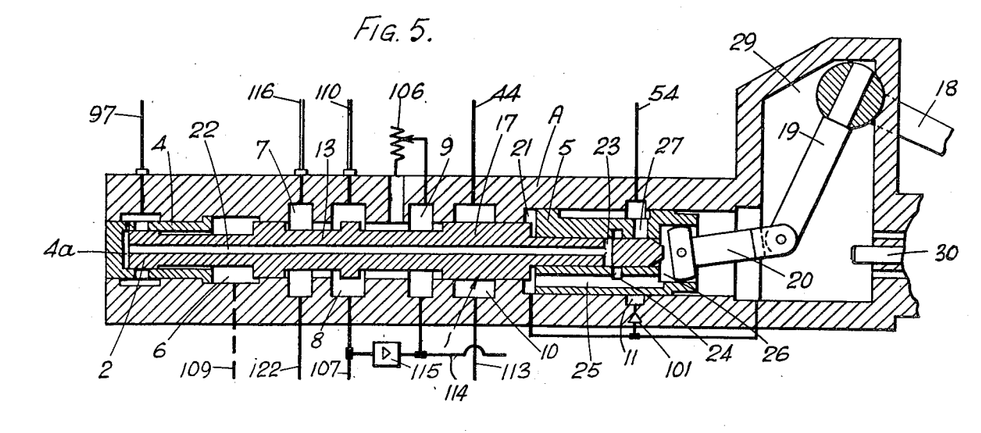

Assuming that the operating lever 18 is operated to draw the sleeve 5 to the position shown in Figure 1a (lower) from the Return position shown in Fig. 5 the pressure in the space 4a will cause the valve piston 1 to follow the sleeve until a position is reached where the reduced portion 3 covers port 27. If the valve piston moves too far so that the radial ports overlap the annular groove 24 pressure liquid will pass down the central passage 22 from space 4a and enter chamber 21 and casing 29. In consequence pressure will immediately build up in this chamber and casing and will act against the full area of the valve piston. The pressure within space 4a acting against the opposite and lesser area end of the valve piston will thus be overcome and the valve piston will be moved back to a position where the radial ports 23 just edge into the annular groove 24. This relative position between the valve piston 1 and the sleeve 5 will automatically be attained and maintained in all positions of the lever 18 other than when the lever is in the Auto position, in which position of the lever the reversing valve B comes into operation and results in the control valve piston 1 reciprocating relatively to the sleeve 5.

Figure 3:
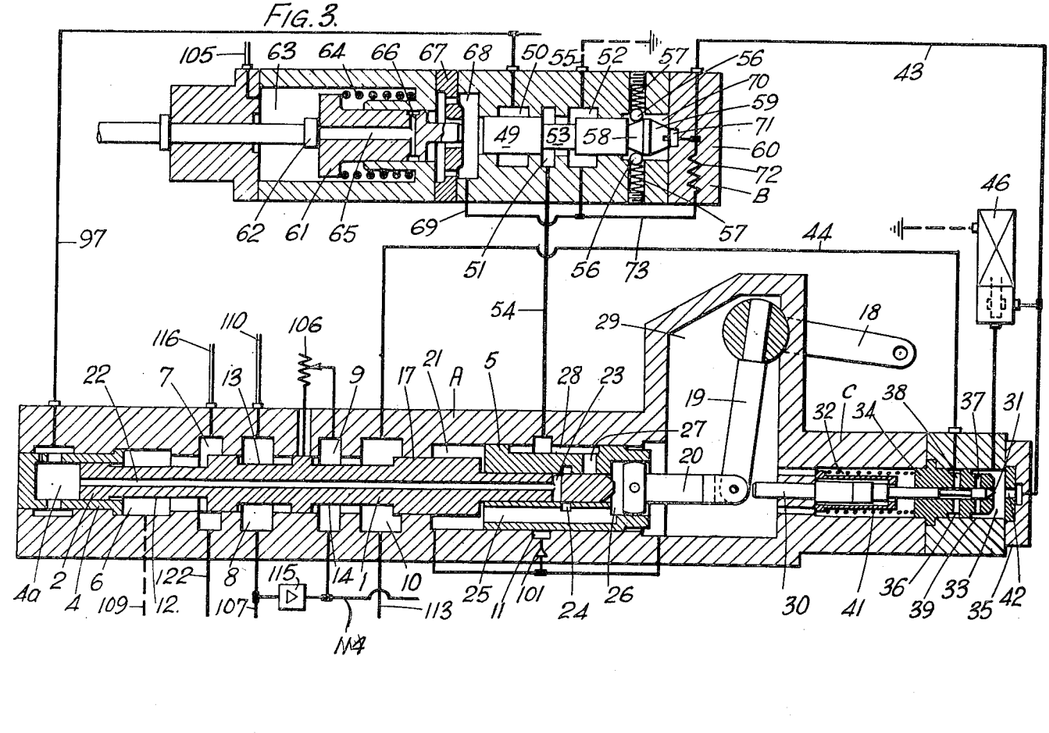
Fig. 3 is a similar view showing the parts when in the "Forge" position and Figs. 4 and 5 illustrate the main control valve in the "Neutral" and "Return" positions respectively.

Should leakage occur of pressure liquid through the central passage 22 into the annular groove 24 pressure will build up in chamber 21 and casing 29 and force the valve piston back until the radial hole 27 is slightly uncovered when the pressure will escape through this hole up pipe 54 and so to exhaust through the reversing valve B as its valve piston 49 will always normally remain in the "exhaust" position shown in Fig. 1a (upper) and Fig. 3.

Figure 2:
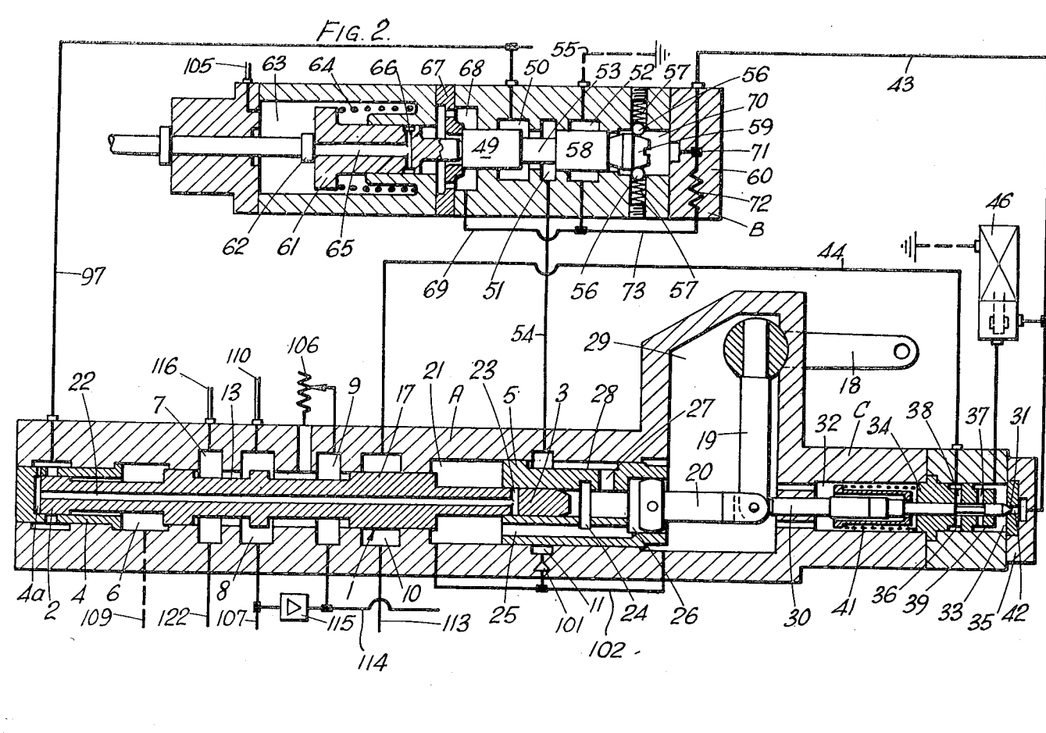
Fig. 2 is a view showing the main control valve and the reversing valve with their respective valve members in the "Auto" position.

If now the operating lever 18 is moved to the "Auto" position shown in Fig. 1a (upper) the reversing valve piston 49 will be shot rapidly to the "pressure" position shown in Fig. 2 as soon as the pressure in the press cylinder is sufficient to open valve 30 against the force of lever 18 or to open relief valve 46 and consequently the exhaust outlet of reversing valve B will be closed and pressure liquid from the accumulator 98 will pass down pipe 54 into the annular groove 11 in valve A past a non-return valve 101 and through branch pipes 102 into chamber 21a and casing 29. The pressure thus acts against the full area of the valve piston 1 of valve A and moves the same to the extreme left or "Return" position.

The press ram will now commence its return stroke and, by means of a small plunger 103 actuated by the press ram and working in a cylinder 104, oil under pressure will be forced through pipe 105 into chamber 63 of the reversing valve B and will thus act against the actuating piston 61 and so force the reversing valve piston back to the "exhaust" position. In consequence chamber 21 and casing 29 will be opened to exhaust through pipe 55 which is connected to pipe 54 by way of valve chambers 51 and 52 and valve piston 1 of valve A will again be moved to the extreme right hand position shown in Fig. 1a (lower). This performance is repeated automatically all the time the operating lever is held in the "Auto" position. Immediately the operating lever is moved to one of the other and non-automatic positions the reversing valve piston will remain stationary in the "exhaust" position and the function of the valve A and also the press will come under the direct control of the hand lever 18.

General operation.—Auto position

Figure 1B:
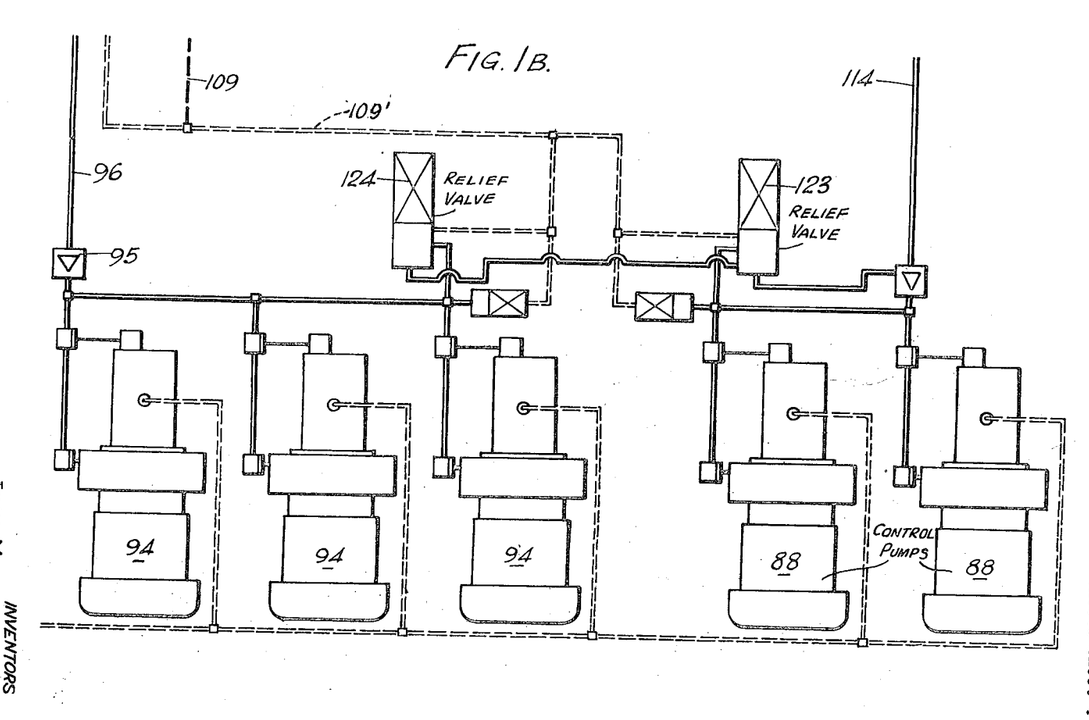

Referring to Figs. 1a and 1b the control valve A is in the "Auto" position, the prefill valve 74 is about to open and the press ram to commence its down or approach stroke.

With the control valve piston in the position shown the push-back cylinders are free to exhaust via pipes 99 and 107 and annular groove 8 through an adjustable choke 106 in the valve A into groove 9 and thence into groove 10 and via pipes 113 and 96 into the press cylinder. Chamber 87 of the prefill valve is open to exhaust by way of pipe 116, annular grooves 7 and 6 and pipe 109 and chamber 85 is connected to the push-back cylinders by way of pipe 110, annular groove 8 and pipes 107 and 99. The prefill valve will thus be opened by pressure difference acting against spring 76 and allow liquid from the prefill tank 111 to flow into the press cylinder 75 and the press ram will also fall by gravity at a rate which is controlled by the adjustable choke 106. During this down movement of the press ram liquid from the prefill tank 111 will flow into small ram cylinder 104 past a non-return valve 112.

When the press ram contacts the work the delivery from the direct pumps 94 will cause pressure to build up within the press cylinder and close the prefill valve. This pressure will then simultaneously build up in chamber 33 in valve C by way of pipe 96, branch pipe 113 leading to annular groove 10 in valve A and thence along pipe 44 and via passages 38 and 39 and reduced portion 40 of spindle 31. When the pressure within chamber 33 reaches a predetermined figure it will overcome the pressure applied by the operator to the valve plunger 30 and move the needle valve 31 back and thus open the outlet hole 42. The pressure surge resulting from the suddenly released pressure will create a back-pressure within the space 71 of the reversing valve B sufficient to displace the valve piston 49 into the "pressure" position and cause the piston 1 of valve A to be moved to the "Return" position shown in Fig. 5.

With the valve piston 1 in the "Return" position, see Fig. 5, control pumps 88 will deliver to both upper and lower chambers 85 and 87 of the prefill valve D by way of pipe 114 into annular grooves 9, 8 and 7. From these annular grooves the pressure liquid will pass to chambers 85 and 87 by way of pipes 110 and 116 respectively.

In consequence of the differential areas 89 and 90 the exhaust valve piston 82 will be forced downwards and cause the striker 81 to open the valves 78 in successive pairs, thus releasing the pressure within the press cylinder, when the main prefill valve 74 will be forced off its seat and allow the liquid within the press cylinder and from the direct pumps 94 to pass into the prefill tank 111. The press ram will then make its return stroke as a result of pressure liquid from the control pumps 88 being pumped into the pushback cylinders 86 by way of pipe 107.

During the return stroke plunger 104 forces fluid into the reversing valve B to shift it to its alternate position and thereby initiate another down stroke of the press ram as above described. This operation will continue automatically for as long as the operating lever 18 is held in the "Auto" position.

Forge position

When the operating lever 18 is moved to the "forge" position the control valve piston 1 will take up the position shown in Fig. 3 and the reversing valve will remain in the "exhaust" position shown. In this position of the valve piston 1 the direct pumps 94 will be delivering directly into the press cylinder 75 through conduit 96 and the control pumps 88 will deliver through conduit 114 to annular groove 9 and from thence to the press cylinder by way of reduced portion 14 of valve piston 1, annular groove 10, branch pipe 113 and pipe 96. Similarly this position of valve piston 1 opens lower chamber 87 of the prefill valve D to exhaust by way of pipe 116, annular groove 7, reduced portion 12 of valve 1, annular groove 6 and pipe 109. Pressure from annular groove 8 will be acting within chamber 85 against the area 89 of prefill valve D and in consequence the main valve 74 thereof will be closed by spring 76 and the down stroke of the press ram will commence. As the press ram is pumped down, pressure liquid from the pushback cylinders 86 will be forced back into the press cylinder by way of pipe 99, a reflux-relief valve 117 and pipes 118 and 113 into pipe 96.

The reflux-relief valve 117 comprises a spring loaded piston 119 which is opened to pass liquid from pipe 114 to pipe 113 by pressure acting on its lower end forcing the same upwards against the spring pressure so as to open the interior chamber 120 to the upper portion of pipe 118. The interior of the chamber 121 containing the spring is, in the "Return" position of valve 1, open to pressure liquid from annular groove 7 by way of pipe 122.

When the work is contacted by the press, pressure will build up until the pressure setting of a relief valve 123 is reached, when the control pumps 88 will be unloaded i. e., by-passed to exhaust. As a result of the operating of the relief valve 123 a further relief valve 124 will function to unload the direct pumps 94.

Figure 4:
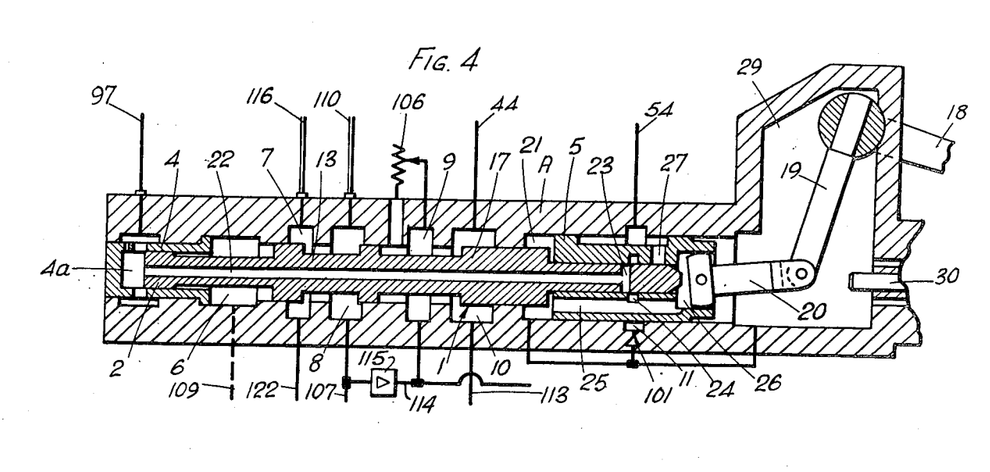

The operating lever 18 should now be moved to the "neutral" position, see Fig. 4, when the delivery of the control pumps 88 will be diverted to lower chamber 87 of the prefill valve D and operate to open in turn the decompression valves 78 and the main valve 74. All pumps will then deliver to exhaust through the press cylinder.

The operating lever 18 may now be moved to the "Return" position, when the valve piston 1 will take up the position shown in Fig. 5. In this position the control pumps 88 will deliver to the pushback cylinders 86 by ways of pipes 107 and 114 and, as pressure liquid is now available in chamber 121 of the reflux-relief valve 117 to hold its valve piston 119 closed so that the pressure in pipe 114 is not limited by valve 117 and also pressure is available to re-charge the accumulator 98. Should the pressure in the line 114 become excessive it will be relieved through a relief valve 125 and branch 109' of the exhaust pipe 109.

According to a further embodiment of this invention not shown a direct-hydraulic press of the type specified may be caused to operate automatically, either single-cycle or continuously repeated cycles, reversal at the end of the operating stroke being effected by a tappet actuated valve which admits pressure oil to chamber 71 of reversing valve B.

In this latter embodiment the valves will be generally similar to those described in the previous embodiments. Thus, with the Operating-lever in the Auto position, the press ram will make the operating stroke and the control-valve spindle will be reversed, either by tappet actuated valve or by the relief valve 46 between the piston-needle valve 42 and the reversing-valve B when the pressure in the press cylinder reaches a predetermined figure. And, if the operating lever is maintained in the Auto position, the press ram will make continuously repeated strokes, the reversing-valve spindle being moved into engagement with the spring detent by the pumping plunger 103 and thereby reversing the control-valve spindle so that the press ram makes a further operating stroke, the automatic cycle continuing until the operating-lever is moved from Auto to Neutral.

Whilst the example shown in the drawings is particularly adapted for a direct hydraulic down-stroking press, the invention is also applicable to the control of a direct hydraulic press in which the press ram operates either horizontally or vertically upwards. In such presses it will be appreciated that the press ram cannot fall by gravity when the operating lever is in the "Auto" position. It will therefore be pumped towards the work by auxiliary rams with the press cylinder supplied with liquid through a prefill valve. Or the cylinder may be direct pumped without a prefilling valve.

It will also be appreciated that in the case of smaller presses the decompression valves 78 may be dispensed with, exhaust being effected suddenly through the main prefill valve 74. In such cases the control valve A will be suitably modified.

It will also be appreciated that the small plunger 103 will act as a self-setting tappet in that no matter how far the press ram penetrates on the forging stroke it will come back each time a predetermined distance which is controlled by the relation of the plunger 103 to the piston 61 and adjustable stop 62 on the reversing valve B.

What we claim is:

1. Control valve mechanism for hydraulic presses comprising, in combination, a first valve having a movable member and pressure fluid operated means for shifting the member, a second valve having a member shiftable manually to any one of a plurality of positions, and other control means including a periodically acting reversing valve operable upon shifting of the movable member of the second valve to a selected one of said plurality of positions for directing pressure fluid to said first fluid operated means to cause the movable member of said first valve to reciprocate continuously.

2. Control valve mechanism as defined in claim 1 in which means is provided in the valves for regulating the pressure of the fluid supplied under control of the mechanism in accordance with the force applied to the movable member of said second valve to hold it in said one position.

3. Control valve mechanism for hydraulic presses comprising, in combination, a first valve having an axially shiftable plunger and pressure fluid operated means for shifting the same, a second valve having a plunger formed with an axial opening slidably receiving one end of said first mentioned plunger and shiftable axially relative thereto, actuating means for shifting said second mentioned valve plunger to a selected one of a plurality of positions, ports in said plungers brought into registration by a predetermined relative positioning of the plungers for directing pressure fluid to said fluid operated means to reposition the plunger of said first valve in accordance with the position to which the plunger of said second valve has been shifted, a reversing valve connected with and operative to control fluid flow to and from said fluid operated means, and fluid connections to said reversing valve rendered effective when the plunger of said second valve is shifted to one selected position for operating the reversing valve to periodically reverse the flow of fluid to said fluid operated means and thereby cause the plunger of said first valve to reciprocate.

4. Control valve mechanism as defined in claim 3 in which said second valve plunger is shiftable to said one position by a hand lever which actuates a fourth valve adapted to control the fluid connections to said reversing valve.

5. Control valve mechanism as defined in claim 3 in which the reversing valve includes a piston element shiftable in opposite directions between two limit positions by pressure fluid, and releasable detent means for retaining said piston element in either limit positions.

6. Control mechanism for a hydraulic press having operating and return cylinders comprising, in combination, a pressure fluid operated main valve selectively operable to control the supply of pressure fluid to said cylinders, a manually operable valve adapted to control the operation of said main valve, and auxiliary valve means controlled by said main valve for releasing pressure fluid from the operating cylinder of the press at a controlled rate to prevent objectionable surge and permit operation of the return cylinder.

7. Control mechanism as defined in claim 6 in which said auxiliary valve includes means controlling the prefilling and exhaust of the press operating cylinder and a pilot valve operated under control of the main valve to release pressure fluid from the operating cylinder at a controlled rate.

8. Control valve mechanism for hydraulic presses comprising, in combination, a first valve having an axially shiftable plunger and pressure fluid operated means for shifting the same, a second valve having a plunger formed with an axial opening slidably receiving the end of said first valve plunger and shiftable axially relative thereto, said plungers jointly controlling the supply of pressure fluid to said fluid operated means to cause the first mentioned plunger to follow the movements of the second mentioned plunger, manually operable means for shifting said second valve plunger to any one of a selected plurality of positions, a third valve actuated by said manually operable means when shifted to one of said positions for initiating the reciprocation of said first valve plunger and for directing pressure fluid to said third valve tending to shift it against the force applied through said manually operable means, said third valve causing pressure fluid to be delivered to the press so that the force exerted thereby will be directly proportional to the force applied to said manually operable means.

9. Control valve mechanism as defined in claim 8 in which the reciprocation of said first valve plunger is controlled by a reversing valve operated under control of said third valve, and means operative in response to the building up of pressure in the press to a predetermined value for shifting said reversing valve.

10. Control valve mechanism for a hydraulic press having operating and return cylinders comprising a main control valve having a plunger shiftable to control the supply to and exhaust of pressure fluid from said cylinders, pressure fluid operated means for shifting said plunger, a reversing valve operative to periodically reverse the pressure fluid supply to said fluid operated means and thereby effect reciprocation of said valve plunger, and a manually operable valve having a plurality of positions in which it is effective to control the pressure fluid supply for said pressure fluid operated means, said manually operable valve having another position in which it is effective to transfer control of said fluid operated means to said reversing valve.

11. The combination with a hydraulic press having a press ram, an operating cylinder for the ram, a return piston and cylinder therefor, and a prefill tank for fluid, of control mechanism including a first valve controlling the flow of fluid between said ram cylinder and said tank, said valve having pressure fluid operated means for effecting a gradual release of pressure built up in the cylinder following a pressing operation, and control means for directing pressure fluid to said valve operating means and to said return cylinder in timed relation to the operation of said pressure releasing means so as to build up pressure on the return cylinder for immediate reversal of the ram upon dissipation of the energy stored in the ram cylinder.

12. Control mechanism as defined in claim 11 in which the control means is in the form of a piston operable under hydraulic pressure to actuate the pressure releasing means and acting additionally as a valve to control the supply of pressure fluid to the return cylinder.

13. Control mechanism as defined in claim 12 in which the pressure releasing means comprises a plurality of decompression valves arranged in pairs about the axis of said first valve, stems for said valves extending axially of the first valve, the stems of each pair being of the same length and differing in length from the stems of the other pairs, and a striker operated by said piston engageable with the valve stems to open the valves successively in pairs.

References Cited in the file of this patent

UNITED STATES PATENTS

| | | |
|---|---|---|
| 2,403,391 | Muir | July 2, 1946 |
| 2,577,981 | Stacy | Dec. 11, 1951 |
| 2,615,466 | Garde | Oct. 28, 1952 |
| 2,618,244 | Roehm | Nov. 18, 1952 |